United States Patent [19]

Weber et al.

[11] Patent Number: 4,973,164
[45] Date of Patent: Nov. 27, 1990

[54] METHOD AND APPARATUS FOR THE OPTICAL DETECTION OF THE ROUGHNESS PROFILE OF A MATERIAL SURFACE

[75] Inventors: Klaus Weber, Königsbronn; Herbert Pettinger, Schäftlarn; Karl Pietzsch, Geretsried, all of Fed. Rep. of Germany

[73] Assignee: Erwin Sick GmbH Optik-Elektronik, Fed. Rep. of Germany

[21] Appl. No.: 311,599

[22] Filed: Feb. 15, 1989

[30] Foreign Application Priority Data

Feb. 24, 1988 [DE] Fed. Rep. of Germany ....... 3805785

[51] Int. Cl.$^5$ ...................... G01B 11/30; G01N 21/47
[52] U.S. Cl. ..................................... 356/371; 356/446
[58] Field of Search ............... 356/371, 359, 376, 237, 356/445–448; 250/571, 572

[56] References Cited

U.S. PATENT DOCUMENTS

| | | | |
|---|---|---|---|
| 4,583,861 | 4/1986 | Yamaji et al. | 356/446 |
| 4,732,485 | 3/1988 | Morita et al. | 356/376 |
| 4,733,064 | 3/1988 | Ishikawa | 250/201 |

*Primary Examiner*—Richard A. Rosenberger
*Assistant Examiner*—Hoa Pham

[57] ABSTRACT

A method and also an apparatus is described for the direct optical detection of the roughness profile of the material surface (10) in which a light bead (14) is generated on the material surface (10) and the reflected light is passed to a light receiver arrangement (16). The angle of reflection of the reflected light and thus the respective surface inclination value is determined for each scanned point of the material surface (10). To determine the angle of reflection the direction of the center of gravity of the scattered reflected light is formed in each case. The desired roughness profile is subsequently reconstructed from the inclination values that are obtained.

1 Claim, 4 Drawing Sheets

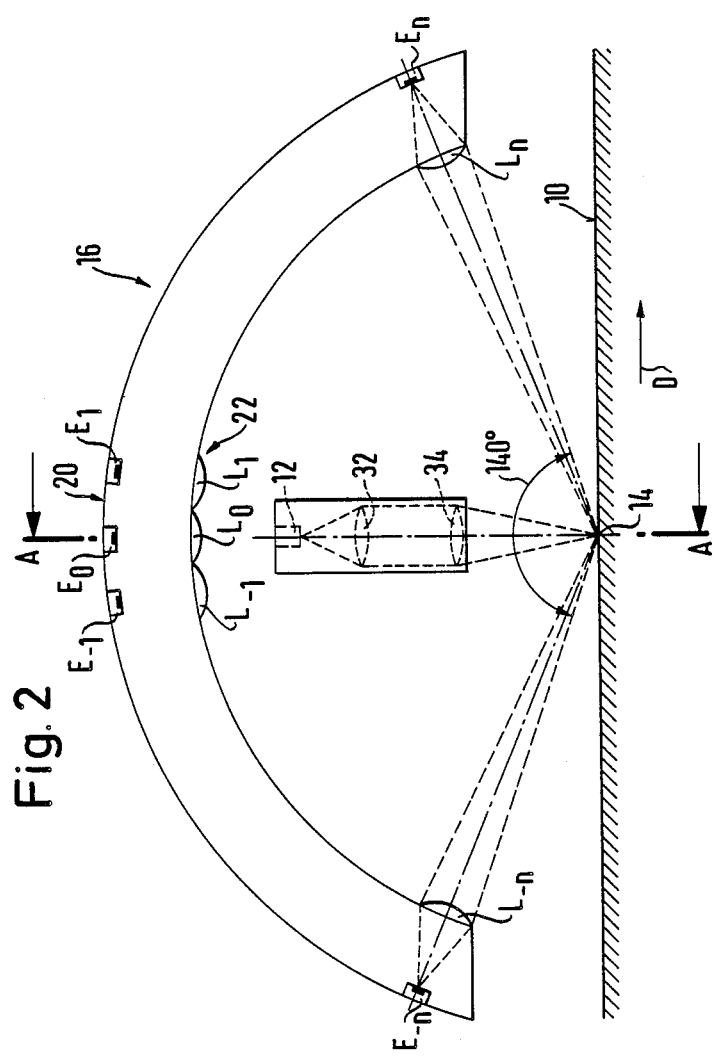

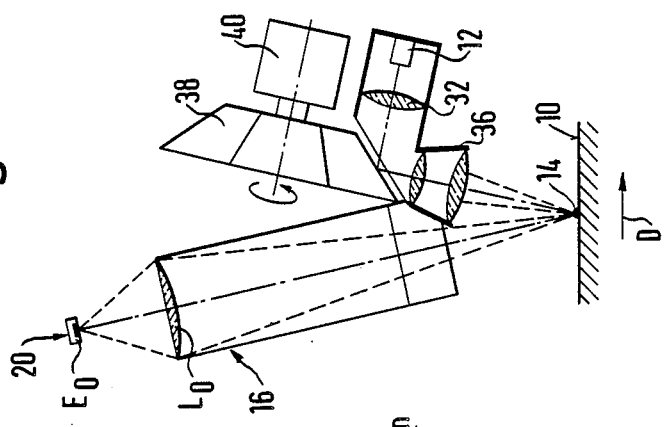
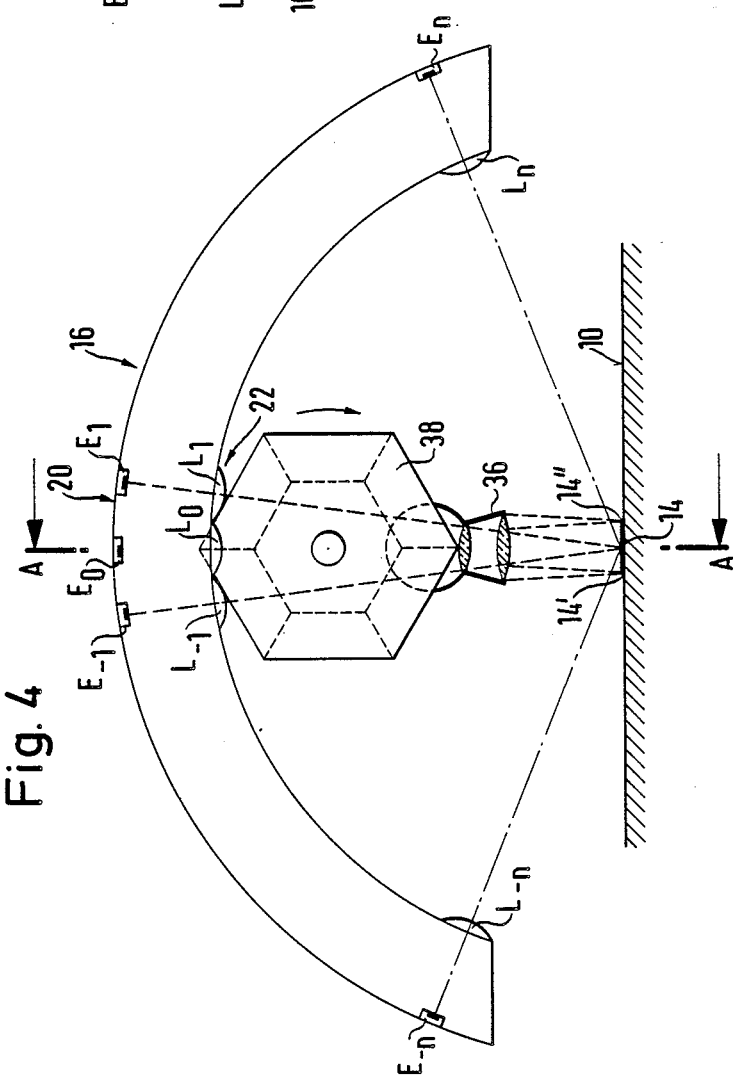
Fig. 5
Fig. 4

METHOD AND APPARATUS FOR THE OPTICAL DETECTION OF THE ROUGHNESS PROFILE OF A MATERIAL SURFACE

BACKGROUND OF THE INVENTION

The invention relates to a method of optically detecting the roughness profile of a moved material surface, wherein a fine light bead is generated on the material surface and the reflected light is passed to a light receiving arrangement. The invention furthermore relates to an apparatus for carrying out the method.

Surface profiles are mainly determined by a direct mechanical profile measurement by means of the so-called stylus method using a diamond tip. This standard measuring method is admittedly universely usable for practically all technical surfaces, the method is however relatively slow and can easily lead to damage to the relevant material surface. It is furthermore unfavourable that a measurement cannot be effected on moving material.

Direct optical profile measuring methods have also already been used in which there is provided, for example, an optical scanning head with a fine light bead and follow-up focussing of the objective as a height measure (OPTIC COMMUNICATIONS, volume 31, No. 3, 1979), or optical scanning through a non-follow-up focus objective (EP No. 0 234 997) with the height dimension being obtained by the difference of two received signals. In the first case it is admittedly possible to obtain a contact-free universal optical measurement for all roughness ranges. The method is however in turn relatively slow (up to ca. 500 Hz) and relatively sensitive to adjustment and vibrations. In the second case the measurement can be carried out more rapidly. However here there is a restricted height measurement range and also a relatively high sensitivity to vibrations.

One can for example obtain an indirect pronouncement concerning the mean roughness through an optical detection of the scattering lobe generated by the material surface (DE No. 30 37 622 A1).

This simple integral method is practically insensitive to vibrations. It is however in particular a disadvantage that the measurement is restricted to profile heights which are smaller than the wavelength $\lambda$ of the light used and a pronouncement on the particular profile shape is not possible. Moreover, the measurement values that are obtained can be ambiguous and preclude, or make more difficult, a clear association to define roughness profiles or characteristic roughness numbers.

SUMMARY OF THE INVENTION

The invention is based on the object of providing an apparatus of the initially named kind with which the above named disadvantages are overcome and which in particular also permits a correspondingly rapid and vibration insensitive measurement on rapidly moving materials with profile heights which are larger than the wavelength $\lambda$ of the light that is used.

The object is solved in accordance with the method of the invention in that for each scanned point of the material surface the angle of reflection of the reflected light and thus the respective surface inclination value is determined; in that the roughness profile is reconstructed from the inclination values obtained along the sequence of scanned points; in that for the determination of the angle of reflection it is in each case the predominant direction of the scattered reflected light that is detected; and in that the reconstruction of the roughness profile, or of the profile section along the scanned sequence of points, is obtained by integration of the inclination values along the scanned sequence of points.

As a result of this construction measurements of the roughness profile can also be carried out on materials which are moving through relatively rapidly or with a relatively high measurement speed. The profile heights which arise can be considerably larger here than the wavelength $\lambda$ of the light that is used. In these cases an unambiguous reconstruction of the relevant roughness profile is always possible from the inclination values that are obtained.

The invention is for example suitable for monitoring the roughness of cold rolled sheet metal for bodywork parts directly at the rolling line.

Whereas as a result of the roughness ranges of sheet metal for bodywork ($R_a = 0.8$ to $2.5$ $\mu$m), only a $CO_2$ ($\lambda = 10.5$ $\mu$m) can be used with the initially named integral scattering lobe evaluation, a laser diode which is substantially easier to handle can be used as a radiation source with the method or apparatus of the invention. The measurement method of the invention is moreover also straightforwardly usable with surface profiles with profile heights of for example 100 $\mu$m.

The reconstruction of the roughness profile or of the profile section along the scanned sequence of points is carried out by integration or by summation of the inclination values along the scanned sequence of points. The predominant angles or inclination values which are found can optionally be temporarily stored or buffered so that the actual measuring process can always be carried out with a higher speed independently of the subsequent computing steps.

By way of example, during roughness measurement on surfaces which have been subject to chip forming machining, one mainly wishes to know the surface profile transverse to the machining direction. In such cases provision is made for the generation of a periodic scanning movement of the light bead transverse to the direction of movement or direction of machining of the material surface.

The customary roughness measurement parameters such as in particular the mean roughness $R_a$ and/or the mean depth of roughness $R_z$ are expediently formed from the reconstructed roughness profile.

The apparatus of the invention which is provided with a laser diode for generating a light bead on the moved material surface and a light receiving arrangement is characterised in that the light receiving arrangement which detects the light reflected from the material surface within a predetermined range of angles of reflection is connected up as a position sensitive light receiving arrangement in order to deliver a pair of output signals ($U_a$, $U_b$) which respectively correspond to the predominant angle of the scattered reflected light.

The surface profile of the material surface is accordingly scanned with an expediently fine light bead in order to detect at each point the angle of the reflected light and thus the surface inclination of the relevant material. In order to ensure direct and problem free detection of the angle of reflection even when scattering of the reflected light occurs the position sensitive light receiving arrangement detects a predeterminable range of scattering angles lying in a plane of the scattered light reflected from the material surface, with this range of scattering angles being as large as possible, in order to directly deliver a pair of output signals which are dependent on the predominant angle as a consequence of the position dependent response behavior.

In accordance with a practical and particularly expedient embodiment of the apparatus of the invention the position sensitive light receiving arrangement includes a plurality of photoelectric converters, preferably photodiodes, which are arranged on a circular arc around the light bead. The photoelectric converters or photodiodes are preferably so combined into a position sensitive circuit that the predominant angle (in German literally "the centre of gravity angle"), or a signal pair dependent on the predominant angle, is directly present at the output.

The photoelectric converters can lie closely adjacent each other on the associated circular arc or are expediently also arranged such that the light bead is imaged by lenses onto a respectively associated converter, with the lenses being arranged close alongside one another on a further circular arc.

The position sensitive light receiving arrangement preferably always receives the entire scattered light reflected into the relatively large angular range of the circular arc of the receiver.

A practical further development of the apparatus is characterised in that the output signals of the photoelectric converters are passed to a resistor chain and in that the output signal dependent on the respective angle of reflection or predominant angle can be tapped off at the resistor chain. This arrangement is preferably made such that the resistor chain is divided up into two part chains and the output signal dependent on the respective angle of reflection or predominant angle is subdivided into two part voltages, with one part voltage being tappable between the one end of the resistor chain and a midpoint between the two chains lying at a reference potential, or earth potential, and with the other part voltage being tappable between the other end of the resistor chain and this midpoint. By way of example a direct information concerning the centre of gravity of the scattered reflected light can be found from the quotient of the difference and sum of the two part voltages. For this purpose the output signal dependent on the predominant angle or on the angle of reflection, or the two part output voltages of the position sensitive light receiving arrangement, are preferably passed to an electronic evaluation circuit for the formation of a measurement value which is directly proportional to the predominant angle or a measurement value representative of the latter.

The required means for forming the surface inclination values from the centre of gravity or reflection angles, and also means for reconstructing the roughness profile from the inclination values, and preferably also means for forming roughness parameters such as in particular the mean roughness value $R_a$ and/or the average depth of roughness $R_z$ from the reconstructed roughness profile, are also provided in the electronic evaluation circuit.

A control which sets the scanning frequency of the relevant point sequence on the material surface is simultaneously associated with the evaluation apparatus. Means for detecting the respective material transport speed can be provided in order to enable, amongst other things an adaptation of the scanning frequency to the respective transport speed.

In accordance with a further embodiment the light bead is periodically movable to and fro on the material surface in a plane which contains the circular arc associated with the photoelectric converters. In this way the possibility is provided of also generating surface profiles transverse to the working direction which is for example of interest with surfaces which have been machined by chip forming methods. In so far as a uniform surface condition is present it is sufficient to merely scan along a region of this surface.

An expedient layout of the apparatus which is particularly suitable for this consists in that the parallel beam generated by the optical collimator system is periodically deflected at constant angular speed and is convertible by a telecentric $F\theta$-objective into a light bead on the material surface, with the light bead being moved at constant speed and constant angle of incidence. The fact that the light bead is always moved at constant speed and is generated at a constant angle of incidence always ensures a reliable measurement.

Further advantageous embodiments of the invention are set forth in the subordinate claims.

BRIEF DESCRIPTION OF THE DRAWING

The invention will now be described in more detail in the following with reference to embodiments and to the drawing in which are shown.

DESCRIPTION OF THE PREFERRED EMBODIMENTS

Figure 1:
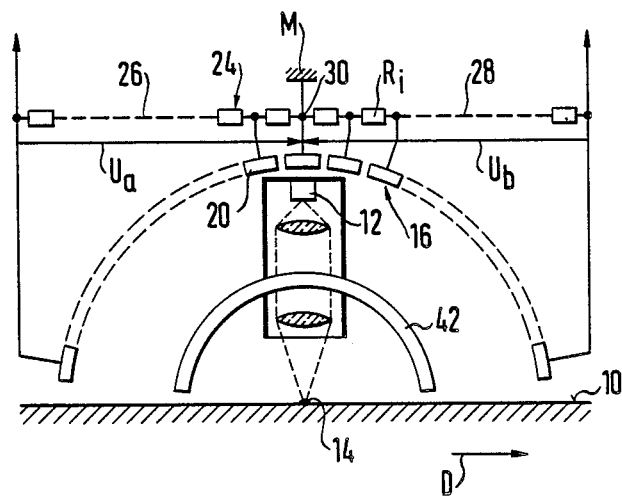
FIG. 1 a schematic representation of an optical roughness probe for the optical detection of the roughness profile of the material surface, FIG. 2 an optical scheme of the optical roughness probe with enlarged working distance, FIG. 3 a section along the line A—A in FIG. 2, FIG. 4 an optical scheme of a further embodiment of an optical roughness probe in which the light bead on the material surface executes a periodic scanning movement, FIG. 5 a section along the line A—A in FIG. 4, and FIG. 6 a block scheme of an evaluation and control logic circuit connected after the light receiving arrangement for the examination of the mean roughness of moved objects.

The optical roughness probe illustrated schematically in FIG. 1 for the detection of the roughness profile of a rapidly moving material surface 10 includes a laser diode 12 as light source, the emission region of which is imaged via an optical system which is described in more detail below in order to form a light bead 14 on the material surface 10. A position sensitive light receiving arrangement 16 is provided which, in the plane of the drawing, picks up a range of scattering angles of the light which is scattered in reflection by the material surface 10. The range of scattering is predetermined by a circular arc which approximately forms a semi-circle. A plurality of photodiodes 20 forming photoelectric converters are arranged alongside one another on the circular arc.

The light scattered from the material surface 10 in reflection is picked up by a toroidal lens 42 and concentrated on the photodiodes 20 distributed on the semi-circle.

The laser diode 12 with the associated optical system is tilted relative to the light receiving arrangement 16 in a plane perpendicular to the plane of the drawing in order to avoid the light reflected back from the material surface being obscured by the transmitter. The toroidal lens 42 is likewise approximately semi-circle in section, with the radius of the associated circle however being smaller than the radius of the circle associated with the photodiodes 20.

A resistor chain 24 is associated with the photodiodes 20 arranged on a circular arc, with the resistor chain being built up of a plurality of individual resistors $R_i$.

The resistor chain 24 is divided up into two part chains 26, 28. A photodiode 20 arranged on the circular arc at the centre is connected with a midpoint 30 which lies between the part chains 26, 28 and has earth potential M.

The position sensitive light receiving arrangement realised in this way has the same number of further photodiodes 20 on each side of the receiver diode centrally arranged on the circular arc. The outputs of of the further photodiodes 20 are respectively connected with a connection point lying between two resistors $R_i$ of the associated part chain 26 or 28, or with the left or right outer connection point of the resistor chain 24.

The photodiode arranged at the left hand outer edge of the associated circular arc is connected with the left hand outer connection point of the resistor chain 24 and the photodiode arranged at the right hand outer edge on the circle is connected to the right hand outer connection point of the resistor chain 24. The outputs of the respective photodiodes lying further towards the inside are respectively fed to the next further inwardly disposed connection point of the resistor chain 24.

The described position sensitive light receiving arrangement 16 thus delivers an output signal depending on the angle associated with the centre of gravity or the reflection angle of the scattered reflected light, with this output signal being tappable in the form of two part voltages from the resistor chain 24.

The part voltage $U_a$ is tapped off at the left hand part chain 26, i.e. between the extreme left hand connection of the resistor chain 24 and earth. The second part voltage $U_b$ occurs between the extreme right hand connection terminal of the resistor chain 24 and the earth potential M, i.e. the midpoint 30.

The direction of movement of the rapidly through moving material is indicated with the arrow D.

A measurement value dependent on the respective angle of the centre of gravity of the scattered light reflected from the material surface 10 can accordingly be directly determined via the two part voltages $U_a$ and $U_b$.

The light beam which generates the light bead 14 impinges in the plane of the drawing almost perpendicularly onto the material surface 10. The part circle formed by the photodiodes 20 of the light receiver arrangement 16 is centered with reference to the straight line formed by the incident light beam, i.e. the regularly reflected beam arising when the material surface is considered to be a plane mirror falls on the photodiode arranged at the centre of the circular arc. If the two part voltages $U_a$ and $U_b$ are of the same size then the angle of the centre of gravity of the reflection at the surface element which is struck by the light bead is equal to zero; i.e. the element has no inclination relative to the macrosurface. If the part voltage $U_b$ is larger than the part voltage $U_a$ then the scattered reflected light in FIG. 1 is inclined to the right in FIG. 1. If in contrast the part voltage $U_a$ is larger then this is a consequence of an inclination of the scattered reflected light to the left in the plane of the drawing of FIG. 1.

The position sensitive light receiving arrangement 16 accordingly directly delivers an output signal in the form of the two part signals $U_a$ and $U_b$ which is dependent on the respectively occurring angle of the centre of gravity. A valve representative of the respectively occurring angle of the centre of gravity is formed by the tangent of the quotient formed from difference of the two part voltages and the sum of these part voltages.

The roughness probe shown can be used for monitoring rapidly through moving materials with profile heights or mean roughness values $R_a$ which are larger than the wavelength $\lambda$ of the laser light generated. The measurement is practically insensitive to vibrations. A possible application is accordingly the monitoring of the roughness of cold rolled sheet metal for bodywork parts directly at the rolling line. The roughness ranges of sheet metal for body parts lies at approximately $R_a$ equal to 0.8 to 2.5 $\mu$m. Whereas in this case it is only possible to operate with $CO_2$ laser light ($\lambda = 10.5$ $\mu$m) with the initially named integral scattering lobe evaluation laser diodes which are substantially easier to handle can be used in the apparatus of the invention and in the method of the invention for the optical determination of surface profiles. The roughness probe of the invention is moreover entirely usable for surface profiles of even 100 $\mu$m height.

The material surface 10 is now scanned by the fine light bead 14 of the described roughness probe in such a way that the angle of the reflected light, and thus the surface inclination, is detected for each position of for example a selected point sequence. By integration of the inclination values along the selected point sequence the respective height profile can be reconstructed without problem.

The detection of the angle of reflection is possible with the described apparatus despite the scattering of the reflected light which is generally present. The entire light which is scattered in reflection over a large angular range of the receiver circular arc is namely picked up by the photodiodes. As a consequence of the position sensitive connection of these diodes a centre of gravity angle is directly detected which sets out the relevant reflection angle which corresponds to the mean inclination of the surface element.

An optical scheme for the optical roughness probe is shown in FIG. 2 with an enlarged working distance. The arrow D once again indicates the direction of movement of the material surface 10.

The emission region of the laser diode 12 which is corrected for distortion by an anamorphotic optical collimator system 32 is first imaged at infinity and subsequently imaged by a further lens or optical system 34 in order to form the light bead 14 on the material surface 10.

The light bead 14 which is generated has a diameter of approximately 15 $\mu$m and scans the material surface 10 which is moved in the direction of the arrow D with a speed of up to 20 m/s. The scattered light reflected from this material surface 10 is concentrated by lenses 22 or $L_0$, $L_1$, ... $L_1$ and $L_{-1}$, ... $L_n$ onto the respectively associated photoreceiver diode 20 or $E_0$, $E_1$ ... $E_n$ and $E_{-1}$ ... $E_{-n}$.

The photodiodes 20 associated with the light receiver arrangements 16 are in turn connected to the resistor chain 24 (see FIG. 1) which is however not shown in FIG. 2. The quotient of the two part voltages $U_a$ and $U_b$ tapped off from the resistor chain 24 or the quotient of the difference and sum formed from these two part voltages again delivers a direct information concerning the angle of the centre of gravity of the light which is scattered in reflection and thus of the inclination angle of the surface element illuminated by the light bead. If the tangent is formed from the last named value then the inclination of this surface element results.

The circular arc associated with the lenses $L_{-n}$ to $L_n$ can have an aperture angle of 120° to 160°. The aperture angle amounts in the present case to 140°.

The lenses $L_{-n}$ to $L_n$ lie closely adjacent one another on the associated circular arc. Each of these lenses concentrates the light impinging on it onto the associated photoreceiver or the associated photodiode $E_{-n}$ to $E_n$. The angle of the centre of gravity or the centre of gravity signals are interrogated with a frequency of 2 MHz. This corresponds to a sequence of measuring points on the surface with a spacing of 10 μm at 20 m/s material speed. The mean inclination angle of the relevant surface element is formed for each of these measurement points, with the tangent of the mean inclination angle setting out the mean inclination. This inclination value can be fed into a rapid measurement value memory.

The desired height profile is then reconstructed by a computer from the sequence of inclination values by integration or by multiplication with the measurement point spacing. From this synthetic profile roughness parameters, such as in particular the mean roughness value $R_a$ and the average depth of roughness $R_z$ are formed. These roughness parameters can be determined from the roughness profile by the same methods as with mechanical roughness measuring apparatus.

By way of example a clock signal is generated, the two part voltages $U_a$ and $U_b$ of the position sensitive diode arrangement are amplified, digitised and converted into inclinations in an electronic control and evaluation circuit. The height profile can then be constructed from these inclination values in the same electronic evaluation circuit and finally the desired roughness values can be computed.

FIG. 3 shows a section along the line A—A in FIG. 2. From this sectional representation it can be seen that the light receiver arrangement 16 having the lenses $L_{-n}$ to $L_n$ and the photodiodes $E_{-n}$ to $E_n$, and also the transmitter arrangement having the laser diode 12, the optical collimating system 32 and also the objective 34, are tilted relative to one another. This is intended to avoid the scattered light reflected from the material surface 10 being obscured by the transmitter arrangement.

A further embodiment of the optical roughness probe of the invention is shown in FIGS. 4 and 5 in which the light bead 14 is periodically moved to and fro in a plane which contains the circular arc associated with the photodiodes 20 or $E_{-n}$ to $E_n$. The scanning movement of the light bead 14 extends here transverse to the direction of movement of the material surface 10 indicated by the arrow D (see FIG. 5).

The parallel beam generated by the optical collimator system 32 is periodically deflected by a mirror wheel 38. The mirror wheel 38 is hereby driven at a constant angular speed by a drive 40. The parallel light beam which is generated by the optical collimator system 32 and periodically deflected at constant angular speed by the mirror wheel 38 is converted by a telecentric Fθ-objective 36 into a light bead 14 on the material surface 10 which is moved at a constant speed and generated at a constant angle of incidence.

This embodiment is particularly suited for the roughness measurement of surfaces machined by chip forming techniques where the surface profile transverse to the machining direction is of interest. In order to be able to detect the profile in this direction during machining the light bead 14 is periodically moved two and fro between an extreme left hand light bead position 14' and an extreme right hand light bead position 14" in the plane of the part circle accommodating the photodiodes 20 and the material surface 10. The direction of this movement extends transversely to the direction of movement of the material surface being scanned which is indicated by the arrow D. If a uniform surface condition can be assumed then it is sufficient, as shown in preceding embodiment (FIG. 4) to scan a corresponding small surface region. This region expediently embraces several machining grooves, the profile of which is detected in this manner.

As in the preceding embodiments the light bead can also have a diameter of approximately 10 to 15 μm.

With a mirror wheel 38 having six surfaces and a scanning length of 15 mm rotating at 8000 rpm the scanning movement of the light bead 14 achieves for example a speed of 12 m/s.

A scanning speed of this kind is in most cases substantially larger than the speed of transport of the material surface 10 or of the relevant workpiece during chip forming machining. The roughness probe with a periodically deflected light bead 14 accordingly permits the detection of the roughness profile at surfaces machined by chip forming machine techniques in the direction which is generally of interest perpendicular to the machining grooves, and also permits the derivation of the relevant characteristic values from this roughness profile.

The remaining elements of the variant shown in FIGS. 4 and 5 correspond to the relevant elements of the variant of FIGS. 2 and 3 with the same reference numerals again being associated with the same parts.

Figure 6:
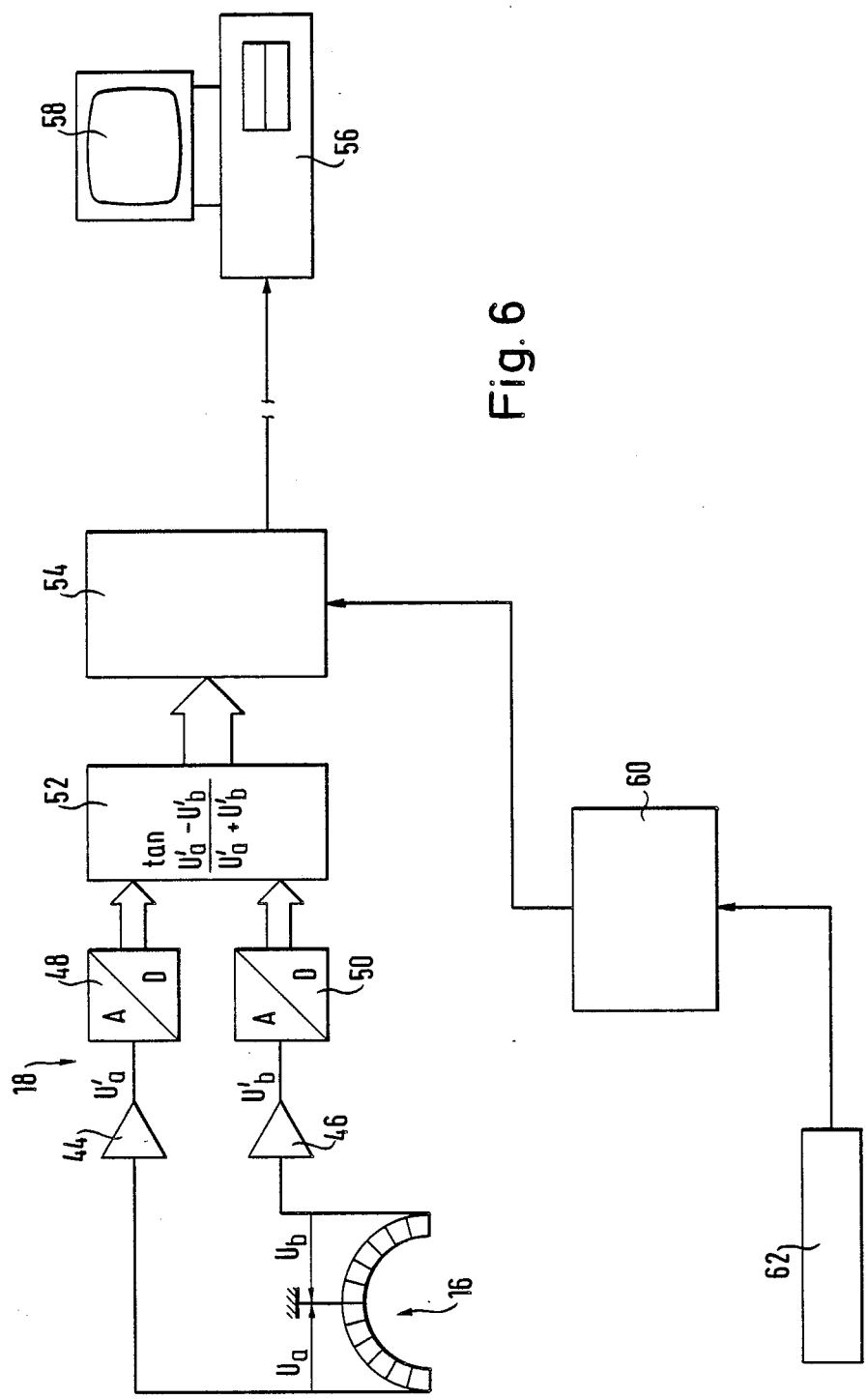

FIG. 6 shows a block scheme of a measurement installation for the continuous examination of the mean roughness of moved objects, for example of cold-rolled sheet metal for bodywork parts directly at the rolling line.

In this arrangement the two part voltages $U_a$ and $U_b$ are tapped off at the relevant outputs of the position sensitive light receiving arrangement 16. These two part voltages are each amplified by means of a preamplifier 44, 46 of a logic evaluation circuit 18, or of a control and evaluation logic circuit, which is connected after the light receiver arrangement 16. The amplified output signals $U'_a$ and $U'_b$ are each passed to an analog/digital converter 48 and 50 respectively. The quotient of the difference and sum of the amplified digitised signals $U'_a$ and $U'_b$ is formed in an arithmetic logic unit 52 connected after the two analog/digital converters 48, 50 in order to obtain a measure for the respective angle of the centre of gravity of the scattered light reflected from the material surface 10 or of the relevant angle of inclination of the surface element. Finally the tangent of this inclination angle is formed so that the inclination of this surface element is ultimately derived.

The output of the arithmetic logic unit 52 is fed to a microprocessor unit 54 with a fast measurement value memory to temporarily store the mean inclination values of the relevant surface elements.

A material speed sensor 62 delivers an output signal to an interface 60 to detect the object speed and the interface 60 delivers the speed information on to a microprocessor unit 54.

The desired height profile is then reconstructed from the sequence of the inclination values by integration or summation, i.e. by multiplication with the measurement spacing by means of a personal computer 56 with an associated display screen 58. The roughness parameters such as in particular the mean roughness value $R_a$ and/or the average depth of roughness $R_z$ is then determined from the synthetic profile.

As a consequence of the detection of the object speed the measuring frequency can be matched to the material transport speed.

We claim:

1. Apparatus for optically detecting the roughness profile of a moved material surface comprising a laser diode (12) for generating a light bead (14) on the moved material surface (10) and a light receiving arrangement (16), wherein the light receiving arrangement (16) which detects the light reflected from the material surface (10) within a predetermined range of angles of reflection is connected up as a position sensitive light receiving arrangement in order to deliver a pair of output signals (Ua, Ub) which respectively corresponds to a predominant angle of scattered reflected light, and wherein output signals of a photoelectric converter (20) are passed to a resistor chain (24) and the pair of output signals (Ua,Ub) dependent on the respective angle of reflection or predominant angle can be tapped off at the resistor chain (24).

* * * * *